Sept. 5, 1967    H. C. SCHULZE    3,340,337
METHOD AND APPARATUS FOR FORMING A PIPE FITTING
Filed Feb. 24, 1964    4 Sheets-Sheet 1
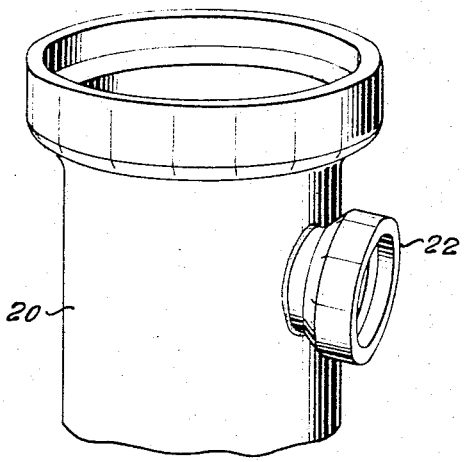
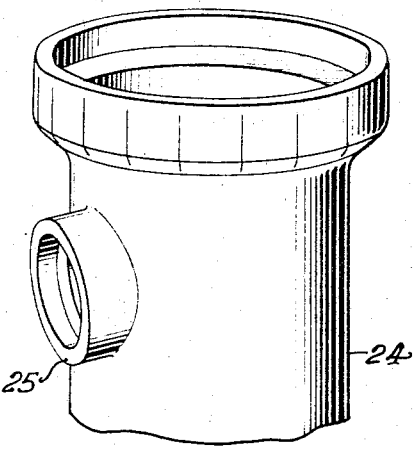
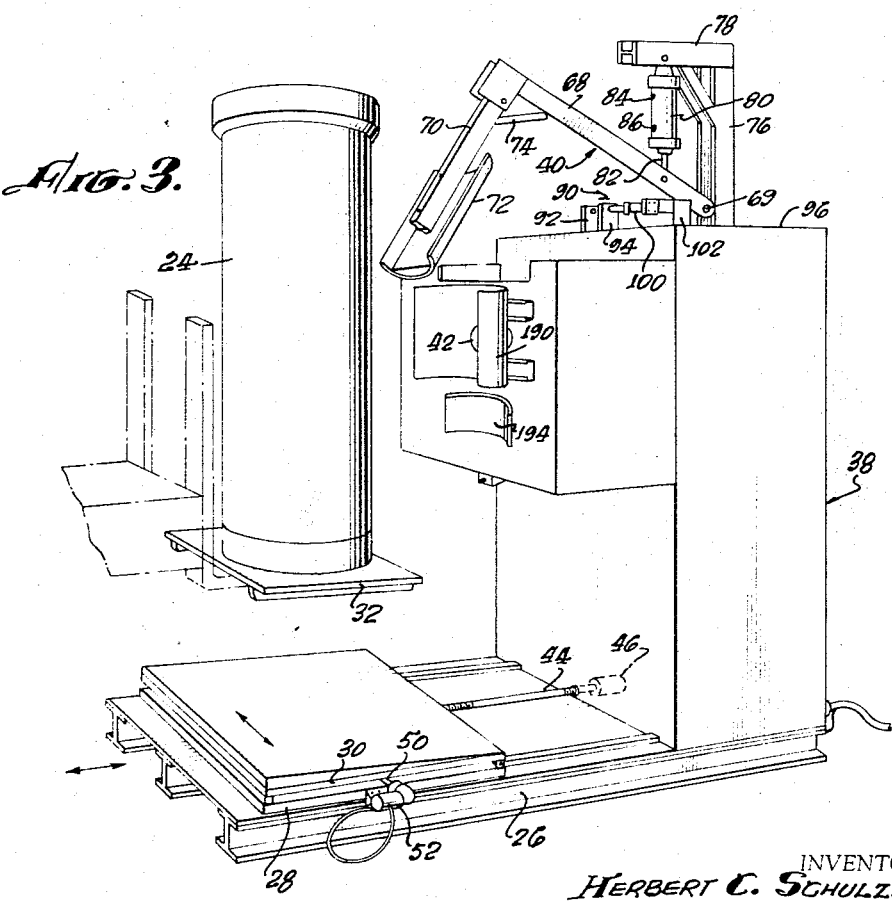
INVENTOR.
HERBERT C. SCHULZE,
BY
Fulwider, Patton, Rieber, Lee & Utecht,
ATTORNEYS.

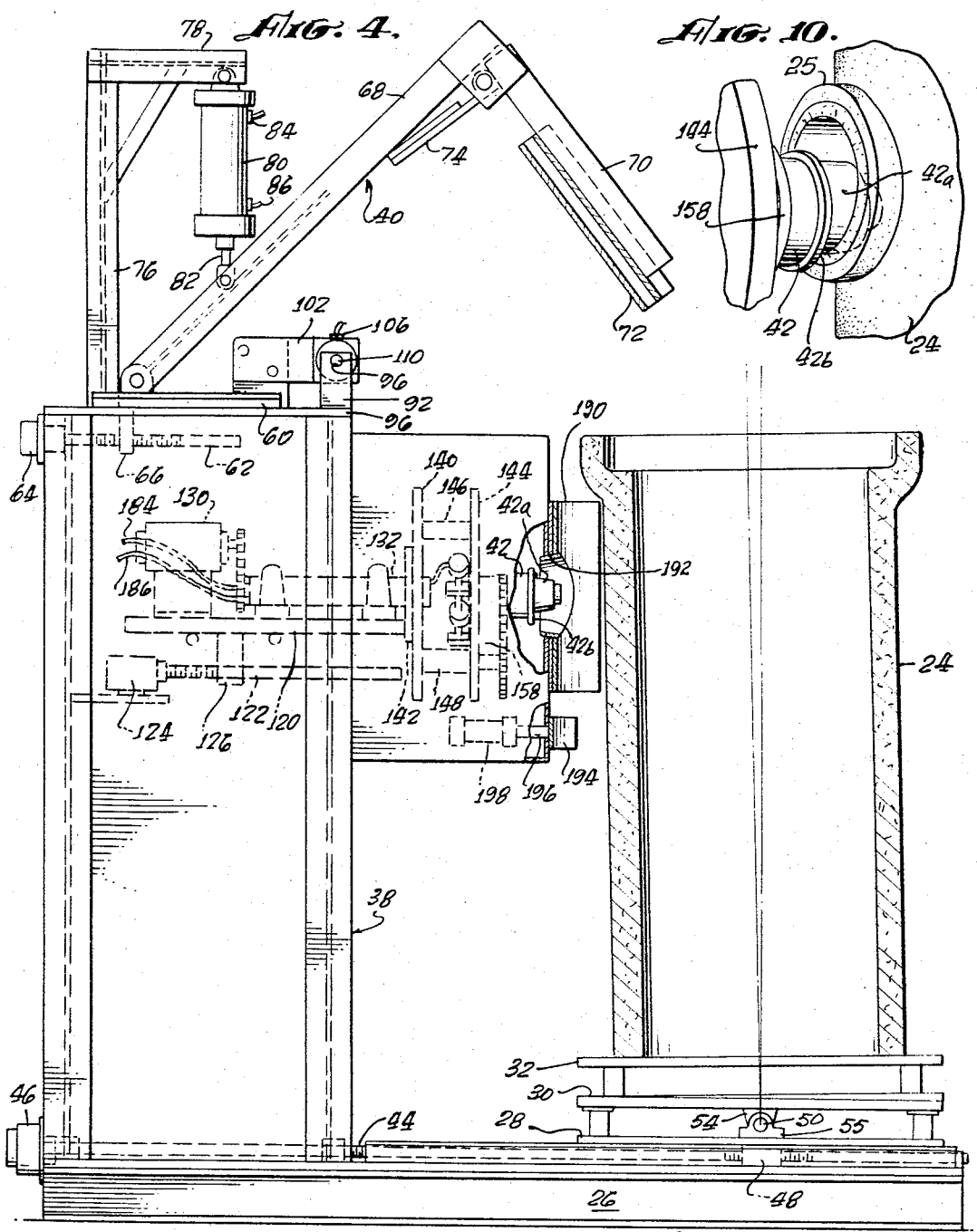

Sept. 5, 1967 H. C. SCHULZE 3,340,337
METHOD AND APPARATUS FOR FORMING A PIPE FITTING
Filed Feb. 24, 1964 4 Sheets-Sheet 3
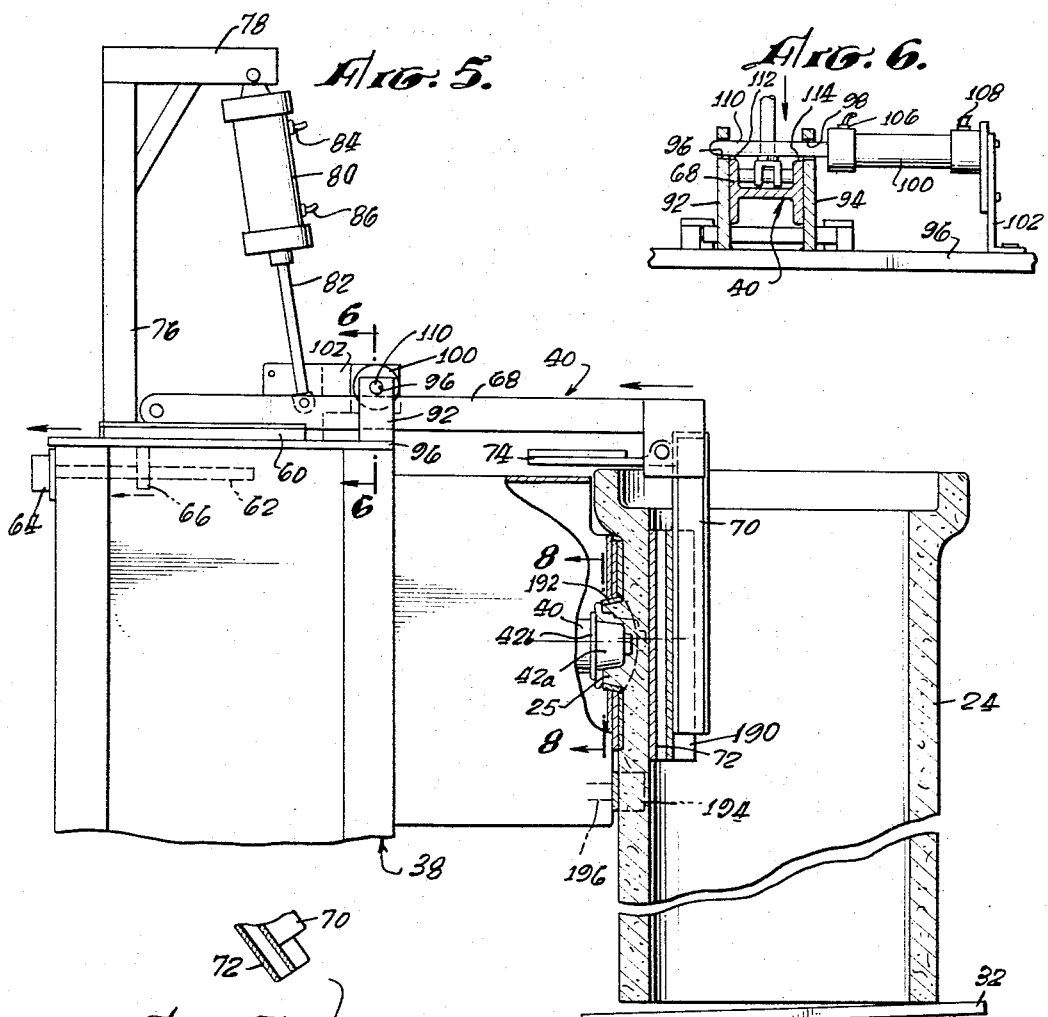
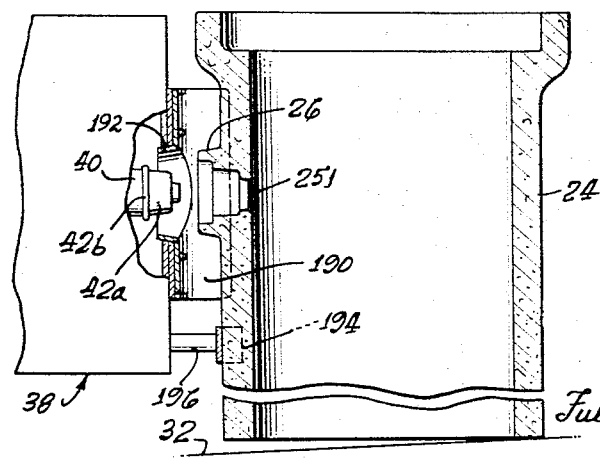
Herbert C. Schulze,
INVENTOR.
BY
Fulwider, Patton, Rieber, Lee & Utecht,
ATTORNEYS.

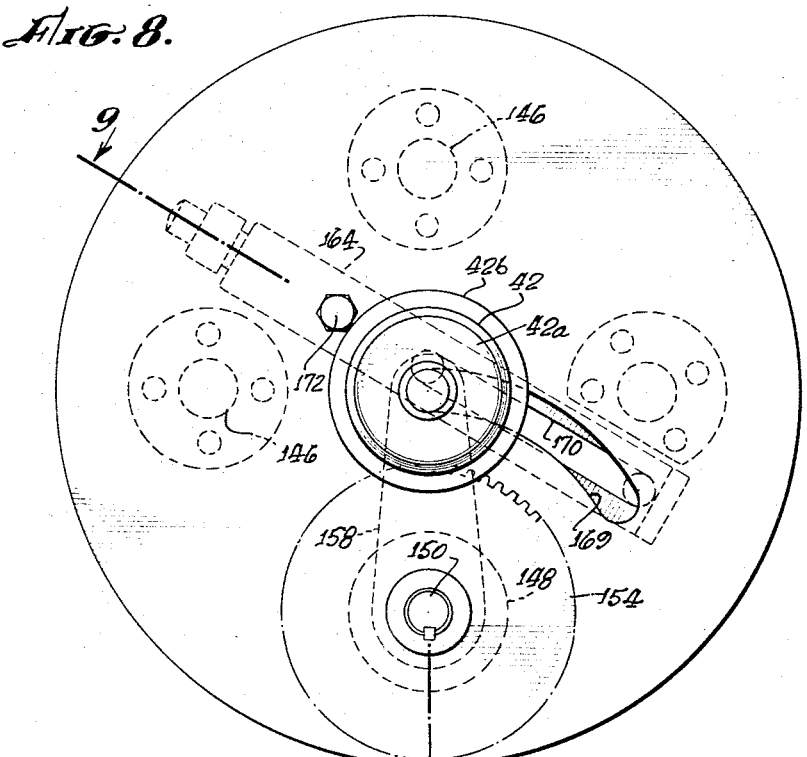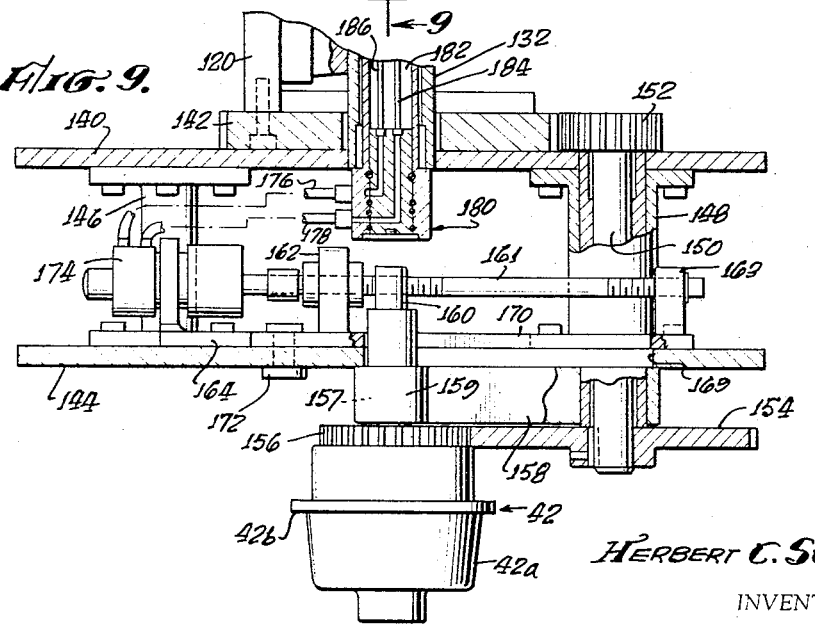

United States Patent Office 3,340,337
Patented Sept. 5, 1967

3,340,337
METHOD AND APPARATUS FOR FORMING A PIPE FITTING
Herbert C. Schulze, 3690 Highland Drive, Carlsbad, Calif. 92008
Filed Feb. 24, 1964, Ser. No. 346,750
24 Claims. (Cl. 264—67)

ABSTRACT OF THE DISCLOSURE

Apparatus and method of forming clay pipe fittings or the like employing a forming collar into which the clay is introduced. A forming mandrel is then advanced into the clay within the confines of the collar. The mandrel is concurrently rotated and orbited within the collar to compress the clay against the inside of the collar.

Background of the invention

Vitrified clay finds wide use in various piping systems, as for example the forming of pipe to carry sewage and other waste matter. Vitrified clay has a distinct advantage over other materials in that it is not attacked by the acids and other impurities present in sewage and the like. In using vitrified clay pipe it is necessary to have main lines of relatively large diameter, for example fifteen inch and upward in size, and it is also necessary to have feeder lines from individual homes or collection of residential units of smaller sizes for example, four inch, six inch, etc. in diameter.

Where the small feeder lines enter the larger lines it is necessary to provide some type of fitting connection so that the small pipe can enter the larger pipe and the contents thereof join in the main stream. It has heretofore been customary to form the fitting connections for such purpose by first making a large pipe section by a conventional extrusion process well known in the trade, and by then cutting a suitable hole in the extruded large diameter pipe before it has been cured and vitrified. Next, a short length of the smaller diameter pipe is fitted into the hole in the larger pipe. This short length is then hand molded to the larger pipe so as to join the two pieces into a unitary, but not integral section. Finally, the two joined-together pipe sections are dried and vitrified in a ceramic kiln.

When the aforedescribed conventional process is utilized the resulting pipe fitting is almost invariably of less than desired quality and in addition such process is slow and tedious requiring considerable hand labor. The joints between the small diameter pipe section and the larger pipe section seldom provide an effective joint because cracks occur which permit infiltration and exfiltration of fluids into and out of the pipe at this joint. In order to obviate this problem it is frequently attempted to seal these joints after the pipe has been vitrified by the use of epoxy or other sealant materials. Such attempts are usually not completely successful and are very often found to be unacceptable to the user. Moreover, the use of a sealant material appreciably increases the cost of the pipe fitting and results in a fitting which is not a monolithic and unitary product.

Summary of the invention

It is a major object of the present invention to provide a new and novel process and apparatus of forming pipe fittings and particularly clay pipe fittings that include a large-diameter section of pipe to which is integrally joined a small-diameter section of pipe.

Another object of the present invention is to provide a process and apparatus of the aforedescribed nature by means of which is produced pipe fittings which are integral, free of cracks and liquid-tight.

A further object of the present invention is to provide a process and apparatus of the aforedescribed nature which permits the pipe fittings to be produced rapidly and with maximum economy as compared with heretofore proposed arrangements for forming such pipe fittings.

An additional object of the present invention is to provide a process and apparatus for forming a branch section in the wall of a pipe section from the material of the latter while such material is in a plastic condition whereafter the completely formed product is hardened.

Another object is to provide a process and apparatus of the aforedescribed nature utilizing a forming mandrel which is rotated and concurrently moved about an orbital path so as to compress the material of the pipe section against a forming collar to thereby form the branch section.

Yet a further object of the invention is to provide a unique apparatus having means for securely holding the pipe section while the branch section is formed whereafter the completely formed product is safely moved away from the forming mandrel and collar without further contact therewith.

Brief description of the drawings

FIGURE 1 is a perspective view showing a conventional pipe fitting formed in accordance with the teachings of the prior art;

FIGURE 2 is a perspective view showing a pipe fitting formed in accordance with the process and apparatus of the present invention;

FIGURE 3 is a perspective view of a preferred form of apparatus usable to carry out the process of the present invention;

FIGURE 4 is a side elevational view in enlarged scale of the apparatus of FIGURE 3 and showing said apparatus arranged to carry out an initial step of said process;

FIGURE 5 is a view similar to FIGURE 6 showing said apparatus carrying out an intermediate step of said process;

FIGURE 6 is a vertical sectional view taken along line 6—6 of FIGURE 5;

FIGURE 7 is a fragmentary view similar to FIGURES 4 and 5 showing a final step of said process;

FIGURE 8 is a vertical sectional view in enlarged scale taken along line 8—7 of FIGURE 5;

FIGURE 9 is a horizontal sectional view taken along line 9—9 of FIGURE 8; and

FIGURE 10 is a fragmentary perspective view showing a forming operation of said process.

Description of the preferred embodiment

Referring to the drawings and particularly FIGURES 1 and 2 thereof, FIGURE 1 represents a conventional pipe fitting formed in accordance with the teachings of the prior art. Such pipe fitting includes a main section 20 and a tubular branch section 22 which extends radially from the main section 20 and is of smaller diameter than such main section. As has been described hereinbefore, the branch section 22 is hand-joined to the main section 20 within an aperture formed in one side of such main section.

Referring now to FIGURE 2, the process and apparatus of the present invention is adapted to provide a pipe fitting having a main section 24 upon one side of which is formed an integral tubular branch section 25. It should be understood that the process of the present invention is carried out while the material of the pipe section 24 is still in a generally plastic condition. In the case of a clay pipe fitting the clay will be uncured during the time such process is being performed.

3

Referring now to the remaining figures of the drawings and particularly FIGURE 4 thereof, a preferred form of apparatus embodying the present invention broadly comprises a base 26 which is provided at its front portion with a main or lower table 28 upon which is mounted an auxiliary or upper table 30. The upper table 30 is adapted to removably receive a pallet 32 upon which is disposed the aforedescribed pipe length 24, such pipe length being arranged in a generally vertical position. The rear portion of the base 26 opposite the tables 28 and 30 is provided with an upstanding housing 38. The upper end of the housing 38 is provided with a clamp unit, generally designated 40, which is adapted to retain the pipe length 24 against movement while a rotating and orbiting forming mandrel 42 is advanced towards the pipe section 24 so as to form the branch section 25 thereon. The forming mandrel 42 includes a frusto-conical main body 42a which is tapered forwardly toward the pipe section 24 and a radially extending shoulder 42b that is formed at the rear of the main body 42a.

More particularly, the lower table 28 is movable towards and away from the housing 38 on suitable ways under the influence of a longitudinally extending drive screw 44. The latter is rotated by means of a suitable motor 46 mounted upon the lower rear portion of the housing 38. The drive screw 44 extends through a complementary drive nut 48 that is secured at its upper portion to the underside of the lower table 28. The upper table 30 is movable on suitable ways in a side-to-side or transverse direction relative to the movement of the lower table 28 by means of a transversely extending drive screw 50. The drive screw 50 is rotated by means of a suitable motor 52 which is affixed to one side of the lower table 28, as indicated particularly in FIGURE 3. The drive screw 50 is engaged with a complementary drive nut 54 having its upper portion affixed to the underside of the upper table 30. A bearing 55 is provided on the lower table 28 for drive screw 50.

With reference to FIGURE 4, it should be particularly noted that the right-hand or front side of the upper table 30 is higher than the left-hand or rear side thereof. This causes an initial tilting of the pipe section 24 towards the housing 38 when the pallet 32 is placed upon the upper table 30. The purpose for such tilting arrangement is fully set forth hereinafter.

With continued reference to FIGURE 4, the clamp unit 40 includes a horizontal mounting plate 60 which is movable towards and away from the pipe section 24, i.e., longitudinally under the influence of a drive screw 62 that is mounted within the upper portion of the housing 38. The drive screw 62 is rotated by means of a suitable motor 64 secured to the upper rear portion of the housing 38. The drive screw 62 extends through a complementary driving nut member 66 which depends from the mounting plate 60. A boom 68 has its rear portion pivotally connected to the mounting plate 60, as by a pin 69. The forward or free end of the boom 40 is pivotally attached to a clamping arm 70, with such arm being formed with an arcuate clamping pad 72 having a convex surface that faces the interior of the pipe section 24 when the boom 68 is in its lowered position of FIGURE 5. Limited pivotal movement between the arm 70 and the boom 68 is afforded by means of a stop element 74 that is rigidly affixed to the upper portion of the arm 70 and extends rearwardly along the underside of the boom 68. An upright post 76 is rigidly affixed to the rear portion of the mounting plate 60. The upper portion of this post 76 is formed with a fixed, forwardly extending arm 78 to which is pivotally attached the upper end of a depending fluid-actuated power cylinder 80. The power cylinder 80 is of conventional construction and includes a plunger rod 82 that slidably extends from the lower portion of such cylinder. Suitable fluid connections 84 and 86 are provided for attaching the opposite ends of the power cylinder 80 to a source of fluid pressure, either air or hydraulic.

The front portion of the upper end of the housing 38 is provided with a boom lockdown unit, generally designated 90, shown in detail in FIGURE 6. This unit includes a pair of upstanding ears 92 and 94 formed with bores 96 and 98 secured at their lower portions to the upper wall 96 of the housing 38. A conventional power cylinder 100 is mounted to one side of the ears 92 and 94 by means of a bracket 102 that is affixed to the top wall 97 of the housing 38. Suitable fluid connections 106 and 108 are provided for actuating the power cylinder 100. A locking plunger 110 is retractable relative to the power cylinder 100. This locking plunger 110 when extended passes through bores 96 and 98 and over the top of the boom arm 68 when it is in its lowered position of FIGURE 5 to lock the boom in this position.

Referring again to FIGURE 4, the forming mandrel 42 and its driving parts are supported upon a longitudinally extending carriage 120 which is movable towards and away from the pipe section 24 by means of a drive screw 122. The drive screw 122 is rotated by means of a suitable motor 124 that is fixedly secured within the rear portion of the housing 38. The drive screw 120 extends through a complementary driving nut member 126 that depends from the intermediate portion of the carriage 120. The carriage is mounted upon rollers or support wheels, indicated generally at 128. The rear portion of the carriage supports a suitable motor 130 which effects rotation of a forwardly extending hollow spindle 132 that is journaled within bearings 134 carried by the carriage 120.

As indicated particularly in FIGURE 9, the front end of the hollow shaft 132 is rigidly affixed as by welding to a rear disc 140 that is coaxial with the spindle 132. A fixed gear 142 is rigidly mounted upon the front end of the carriage 120 immediately rearwardly of the rear disc 140 and coaxial with spindle 132. A front disc 144 coaxial with the rear disc 140 is rigidly supported relative to the rear disc 140 by means of a plurality of spacer bars 146 and a hollow tube 148. The tube 148 rotatably houses a shaft 150. A pinion 152 is keyed to the rear of the shaft 150. This pinion 152 is meshed with the aforedescribed fixed gear 142. A second pinion 154 is keyed to the front end of the shaft 150. The front pinion 154 is meshed with a gear 156 that is rigidly affixed to the rear of the forming mandrel 42. The forming mandrel 42 and its gear 156 are fixed to a stub shaft 157 that is supported by one end of a forming mandrel support arm 158, suitable bearings being provided for this purpose. The opposite end of said arm 158 is pivotally carried by the shaft 150. A boss 159 extends rearwardly from the arm 158 in alignment with stub shaft 157. This boss 159 pivotally receives a lug 160 that is threaded to receive a drive screw 161. The drive screw 161 is journaled within bearings 162 and 163 that extend rearwardly from a drive motor support arm 164. The latter is pivotally secured to the rear surface of the front disc 144 by a suitable pivot pin 172. The boss 159 moves within an arcuate slot 169 formed in front disc 144 and a second slot 170 formed in arm 164. The left-hand portion of the arm 164 carries a suitable motor, such as air motor 174, that is coupled to the drive screw 164 for rotating the latter. Air for operating the air motor 174 is provided by means of conduits 176 and 178 that are connected to a conventional double outlet rotary air coupling 180 carried by the front end of an air tube 182 that extends through the hollow spindle 132. The air tube 182 receives air from suitable couplings 184 and 186 disposed to the rear of the motor 130, as indicated particularly in FIGURE 4.

With the aforedescribed arrangement, rotation of the hollow spindle 132 will effect concurrent rotation of the discs 140 and 144. Inasmuch as the pinion 152 is meshed with the fixed gear 142, rotation of the discs will effect concurrent rotation of the pinion 152, the shaft 150 and the forward pinion 154. Rotation of the forward pinion 154 will effect concurrent rotation of the gear 156 and hence of the forming mandrel 42. When the air motor 174 effects rotation of the drive screw 161 the rotating forming mandrel 42 will be caused to move radially outwardly relative to the front disc 144 within the slots 169 and 170. During such rotation of the drive screw 161, the arm 164 can pivot relative to the front disc 144 because of its pivotal connection thereto. The forming mandrel 42 will therefore be seen to follow an orbital path with respect to the axis of the spindle 132 and the discs 140 and 144, such mandrel rotating while following this orbital path.

The upper front portion of the housing 38 is provided with an arcuate saddle 190 having a concave side facing the pipe section 24 and of a curvature generally corresponding to the exterior surface of such pipe section. The mid-portion of the saddle 190 is formed with a frusto-conical forming collar 192 that is coaxial with the spindle 132 and the front and rear discs 140 and 144. Below the saddle 190 is mounted a pusher yoke 194. The pusher yoke is of arcuate configuration having a concave side facing the pipe section 24. The pusher yoke 194 is fixedly secured to the front of a plunger 196 that extends from a conventional power cylinder 198. The power cylinder 198 is rigidly secured to the housing 38 and extends longitudinally with respect thereto. Suitable fluid connections (not shown) are provided for effecting longitudinal movement of the pusher yoke 194 towards and away from the pipe section 24.

In the operation of the aforedescribed apparatus, a pipe section 24 arranged upon a pallet 32 will be loaded upon the upper table 30 as by means of a forklift in the manner indicated in FIGURE 3. At this time the lower table 28 will be arranged at the front of the base 26, the boom 68 will be arranged in its raised position, the forming mandrel 42 will be arranged in its retracted position and the pusher yoke 194 will likewise be arranged in its retracted position, all as indicated in FIGURES 3 and 4. It should be particularly noted that the pipe section 24 has its upper end tilted rearwardly towards the forming mandrel 42 at this time. The upper table 30 will then be adjusted transversely so as to center the pipe section 24 relative to the spindle 132 and forming collar 192. Next, the lower table 30 will be retracted rearwardly towards the housing 38 until the pipe section 24 abuts the saddle 190 and pusher yoke 194. Referring to FIGURE 5, it will be observed that as a result of such abutment of the pipe section 24 with the saddle 190 and pusher yoke 194, the pipe section 24 will be tilted forwardly to a vertically extending position, the side of the pipe section 24 adjacent the saddle 190 and pusher yoke 194 actually being lifted off the pallet 32, as indicated by the directional arrow in FIGURE 5.

The power cylinder 80 is then actuated so as to lower the boom 68 and pad 72 to their position of FIGURE 5 and the power cylinder 100 is actuated so as to extend the locking plunger 110 across the top of the boom 68. At this time the pipe section 24 will be held securely against the saddle 190 by the clamping pad 72.

With the spindle 132 undergoing rotation, the motor 124 will be actuated so as to advance the carriage 120. This will advance the nose of the forming mandrel 42 into but not all the way through the adjacent wall of the pipe section 24, as indicated in FIGURE 5. At this time the shoulder 42b of the forming mandrel will be disposed adjacent the radially outer edge of the forming collar 192. Thereafter, the rotating forming mandrel 42 will be moved radially outward relative to the forming collar 192. The forming mandrel will then follow an orbital path around the inner perimeter of the forming collar 192 so as to compress the wall material of the pipe section 24 against the inner surface of the forming collar. It should be particularly noted that the geometry of the forming mandrel actuating elements should preferably be so designed that the surface speed of rotation of the forming mandrel with respect to the wall material of the pipe section 24 is of a magnitude to cause slippage of the forming mandrel in the direction of orbital travel of the forming mandrel, it being understood that the forming mandrel rotates in the opposite direction as its direction of orbital travel. The magnitude of the surface speed of rotation of the forming mandrel should be at least equal to the surface speed of rotation that would take place if the mandrel were being rolled over the wall material of the pipe section during its orbital travel. As the rotating forming mandrel thus undergoes orbital travel it will progressively compress the wall material of the pipe section against the inner surface of the forming collar 192 to a desired density and surface smoothness and thereby form the branch section 25 on the pipe section 24, as indicated in FIGURE 10. As indicated in FIGURE 7, the internal configuration of the branch section 25 will correspond to the profile of the forming mandrel 42. As is also seen in this figure a thin web 251 of the wall material of the pipe section 24 will usually remain within the innermost portion of the branch section 25. This web 251 can later be easily removed by means of a suitable cutting tool (not shown).

When the branch section 25 has been compacted to the desired density the forming mandrel 42 will be returned to a position substantially coaxial with the forming collar 192 and the spindle 132 will be retracted so as to return the forming mandrel to its position of FIGURE 4. The power cylinder 198 is then actuated so as to cause the pusher yoke 194 to exert a yielding force upon the pipe section 24. The locking plunger 110 is retracted and the boom 68 is then raised to its position of FIGURE 4. Next, the lower table 28 will be moved away from the forming mandrel 32. It is important to note that as the pipe section 24 is thus moved away from the forming mandrel 42 the pusher yoke 194 moves along with the pipe section so as to retain the pipe section in a vertical position until such time as the outer end of the branch section 25 has cleared the confines of the forming collar 192, as indicated in FIGURE 7. This feature prevents any damaging contact between the branch section 25 and the forming collar. It is desirable to provide the aforedescribed pipe section tilting arrangement since the lower end of the pipe section 24 and/or its supporting pallet 32 are generally not arranged in a perfectly horizontal plane. Should the pipe originally be tilted away from the forming collar 192, the branch section could move away from the forming collar in a path that would cause the latter to break off part of the branch section. The aforedescribed arrangement insures that the branch section 25 always moves away from the forming collar along a path aligned with the axis of such collar. The completely formed pipe fitting may now be removed from the upper table 30 as by a fork lift and cured and vitrified in the usual manner. The resulting pipe fitting is integral, liquid-tight and free of cracks.

It should be noted that the clamping pad 190 may be formed with an aperture to receive the forming mandrel 42 where additional penetration of the wall of pipe section 25 is desired. It should also be noted that the aforedescribed process and apparatus may be employed to form fittings from various moldable materials other than clay, such as asbestos-cement, concrete and the like. Also, hollow articles other than pipe fittings may be formed by the aforedescribed process and apparatus.

Various other modifications and changes may be made with respect to the foregoing detailed description without departing from the spirit of the present invention or the scope of the following claims.

I claim:
1. Apparatus for forming a tubular extension on a length of moldable material, comprising:
   a power-rotated forming mandrel;
   a forming collar disposed adjacent said material;
   means for advancing said mandrel into said moldable material within the confines of said collar;

and means for effecting orbital movement of said rotating mandrel within said collar so as to compress said material against the inner surface of said collar.

2. Apparatus for forming a tubular extension on a length of moldable material, comprising:
a power-rotated forming mandrel;
a forming collar disposed adjacent said material;
means for advancing said mandrel into said moldable material within the confines of said collar;
and means for effecting orbital movement of said rotating mandrel within said collar so as to compress said material against the inner surface of said collar, the surface speed of rotation of said mandrel with respect to said material being at least equal to the surface speed of rotation that would take place if said mandrel were being rolled over said material during said orbital movement.

3. Apparatus for forming a tubular extension on a length of moldable material, comprising:
a power-rotated forming mandrel;
a forming collar disposed adjacent said material;
means for advancing said mandrel into said moldable material within the confines of said collar;
and means for effecting orbital movement of said rotating mandrel within said collar so as to compress said material against the inner surface of said collar, the surface speed of rotation of said mandrel with respect to said material being of a magnitude to cause slippage of said mandrel on said material in the direction of orbital travel of said mandrel.

4. Apparatus for forming a tubular extension on a length of moldable material, comprising:
a power-rotated forming mandrel;
support means for said length that normally supports said length with its upper end tilted towards said forming mandrel;
a forming collar;
means for moving said support means between a first location spaced from said collar and a second location wherein said length is adjacent said forming collar and said length is arranged in a vertical position;
means for advancing said rotating mandrel into said moldable material within the confines of said collar;
means for effecting orbital movement of said rotating mandrel within said collar so as to compress said material against the inner surface of said collar and thereby form said tubular extension;
and means for urging said length toward vertical position as said support means is returned to its first location whereby said formed tubular extension will not contact said collar at an angle displaced from the axis of said collar.

5. Apparatus for forming a tubular extension on a length of moldable material, comprising:
a power-rotated forming mandrel;
support means for said length that normally supports said length with its upper end titlted towards said forming mandrel;
a forming collar;
means for moving said support means between a first location spaced from said collar and a second location wherein said length is adjacent said forming collar and said length is arranged in a vertical position;
means for advancing said rotating mandrel into said moldable material within the confines of said collar;
means for effecting orbital movement of said rotating mandrel within said collar so as to compress said material against the inner surface of said collar and thereby form said tubular extension, the surface speed of rotation of said mandrel with respect to said material being at least equal to the surface speed of rotation that would take place if said mandrel were being rolled over said material during said orbital movement;
and means for urging said length toward vertical position as said support means is returned to its first location whereby said formed tubular extension will not contact said collar at an angle displaced from the axis of said collar.

6. Apparatus for forming a tubular extension on a length of moldable material, comprising:
a power-rotated forming mandrel;
support means for said length that normally supports said length with its upper end tilted towards said forming mandrel;
a forming collar;
means for moving said support means between a first location spaced from said collar and a second location wherein said length is adjacent said forming collar and said length is arranged in a vertical position;
means for advancing said rotating mandrel into said moldable material within the confines of said collar;
means for effecting orbital movement of said rotating mandrel within said collar so as to compress said material against the inner surface of said collar and thereby form said tubular extension, the surface speed of rotation of said mandrel with respect to said material being of a magnitude to cause slippage of said mandrel on said material in the direction of orbital travel of said mandrel;
and means for urging said length toward vertical position as support means is returned to its first location whereby said formed tubular extension will not contact said collar at an angle displaced from the axis of said collar.

7. Apparatus for forming a tubular extension on a length of moldable material, comprising:
a frame;
a power-rotated forming mandrel on said frame;
a forming collar on said frame;
table means for said length movable horizontally on said frame between a first location wherein said length has its upper end tilted towards said forming mandrel and a second location adjacent said forming collar;
means for moving said table means horizontally between said locations;
saddle means on said frame that engage said length as it is moved into said second location and tilts said length into a vertical position;
means for advancing said rotating mandrel into said moldable material within the confines of said collar;
means for effecting orbital movement of said rotating mandrel within said collar so as to compress said material against the inner surface of said collar and thereby form said tubublar extension;
and yoke means below said saddle means for yieldably urging said length towards a vertical position as said table means is returned to its first location whereby said formed tubular extension will not contact said collar at an angle displaced from the axis of said collar.

8. Apparatus for forming a tubular extension on a length of moldable material, comprising:
a frame;
a power-rotated forming mandrel on said frame;
a forming collar on said frame;
table means for said length movable horizontally on said frame between a first location wherein said length has its upper end tilted towards said forming mandrel and a second location adjacent said forming collar;
means for moving said table means horizontally between said locations;
saddle means on said frame that engage said length as it is moved into said second location and tilts said length into a vertical position;

means for advancing said rotating mandrel into said moldable material within the confines of said collar;

means for effecting orbital movement of said rotating mandrel within said collar so as to compress said material against the inner surface of said collar and thereby form said tubular extension, the surface speed of rotation of said mandrel with respect to said material being at least equal to the surface speed of rotation that would take place if said mandrel were being rolled over said material during said orbital movement;

and yoke means below said saddle means for yieldably urging said length towards a vertical position as said table means is returned to its first location whereby said formed tubular extension will not contact said collar at an angle displaced from the axis of said collar.

9. Apparatus for forming a tubular extension on a length of moldable material, comprising:

a frame;

a power-rotated forming mandrel on said frame;

a forming collar on said frame;

table means for said length movable horizontally on said frame between a first location wherein said length has its upper end tilted towards said forming mandrel and a second location adjacent said forming collar;

means for moving said table means horizontally between said locations;

saddle means on said frame that engage said length as it is moved into said second location and tilts said length into a vertical position;

means for advancing said rotating mandrel into said moldable material within the confines of said collar;

means for effecting orbital movement of said rotating mandrel within said collar so as to compress said material against the inner surface of said collar and thereby form said tubular extension;

clamp means on said frame positioned out of the path of said length when said table is disposed in said first location, said clamp means engaging said length after said table has been moved to said second location;

and yoke means below said saddle means for yieldably urging said length towards a vertical position as said table means is returned to its first location whereby said formed tubular extension will not contact said collar at an angle displaced from the axis of said collar.

10. Apparatus for forming a tubular extension on a length of moldable material, comprising:

a frame;

a power-rotated forming mandrel on said frame;

a forming collar on said frame;

table means for said length movable horizontally on said frame between a first location wherein said length has its upper end tilted towards said forming mandrel and a second location adjacent said forming collar;

means for moving said table means horizontally between said locations;

saddle means on said frame that engage said length as it is moved into said second location and tilts said length into a vertical position;

means for advancing said rotating mandrel into said moldable material within the confines of said collar;

means for effecting orbital movement of said rotating mandrel within said collar so as to compress said material against the inner surface of said collar and thereby form said tubular extension, the surface speed of rotation of said mandrel with respect to said material being at least equal to the surface speed of rotation that would take place if said mandrel were being rolled over said material during said orbital movement;

clamp means on said frame positioned out of the path of said length when said table is disposed in said first location, said clamp means engaging said length after said table has been moved to said second location;

and yoke means below said saddle means for yieldably urging said length towards a vertical position as said table means is returned to its first location whereby said formed tubular extension will not contact said collar at an angle displaced from the axis of said collar.

11. A process for forming a tubular extension on a length of moldable material that includes, providing a forming zone defined by a rigid closed surface, positioning said length adjacent said forming zone, introducing a rotating mandrel into said forming zone, said mandrel penetrating said material, and orbiting said rotating mandrel around said surface to compress the material displaced by said mandrel against said surface to thereby form said extension.

12. A process as set forth in claim 11 wherein said material is uncured clay and said clay is cured after said extension has been formed.

13. A process for forming a tubular extension on a length of moldable material that includes, providing a forming zone defined by a rigid closed surface, positioning said length adjacent said forming zone, introducing a rotating mandrel into said forming zone, said mandrel penetrating said material, and orbiting said rotating mandrel around said surface to compress the material displaced by said mandrel against said surface to thereby form said extension, the surface speed of rotation of said mandrel with respect to said material being at least equal to the surface speed of rotation that would take place if said mandrel were being rolled over said material during its orbital movement.

14. A process as set forth in claim 13 wherein said material is uncured clay and said clay is cured after said extension has been formed.

15. A process for forming a tubular extension on a length of moldable material that includes, providing a forming zone defined by a rigid closed surface, positioning said length adjacent said forming zone, introducing a rotating mandrel into said forming zone, said mandrel penetrating said material and orbiting said rotating mandrel around said surface to compress the material displaced by said mandrel against said surface to thereby form said extension, the surface speed of rotation with respect to said material being of a magnitude to cause slippage of said mandrel on said material in the direction of orbital travel of said mandrel.

16. A process as set forth in claim 15 wherein said material is uncured clay and said clay is cured after said extension has been formed.

17. A process for forming a tubular extension on a length of moldable material that includes, providing a forming zone defined by a rigid frusto-conical surface, positioning said length adjacent said forming zone, introducing a rotating frusto-conical mandrel into said forming zone, said mandrel penetrating said material, and orbiting said rotating mandrel around said surface to compress the material displaced by said mandrel against said surface to thereby form said extension.

18. A process as set forth in claim 17 wherein said material is uncured clay and said clay is cured after said extension has been formed.

19. A process for forming a tubular extension on a length of moldable material that includes, providing a forming zone defined by a rigid frusto-conical surface, positioning said length adjacent said forming zone, introducing a rotating frusto-conical mandrel into said forming zone, said mandrel penetrating said material, and orbiting said rotating mandrel around said surface to compress the material displaced by said mandrel against said surface to thereby form said extension, the surface speed of rotation of said mandrel with respect to said material being at least equal to the surface speed of rotation that would take place if said mandrel were being rolled over said material during its orbital movement.

20. A process as set forth in claim 19 wherein said material is uncured clay and said clay is cured after said extension has been formed.

21. A process for forming a tubular extension on a length of moldable material that includes, providing a forming zone defined by a rigid frusto-conical surface, positioning said length adjacent said forming zone, introducing a rotating frusto-conical mandrel into said forming zone, said mandrel penetrating said material, and orbiting said rotating mandrel around said surface to compress the material displaced by said mandrel against said surface to thereby form said extension, the surface speed of rotation with respect to said material being of a magnitude to cause slippage of said mandrel on said material in the direction of orbital travel of said mandrel.

22. A process as set forth in claim 21 wherein said material is uncured clay and said clay is cured after said extension has been formed.

23. Apparatus for forming a moldable material, comprising:
a power-rotated forming mandrel;
a forming collar disposed adjacent said material;
means for advancing said mandrel into said moldable material within the confines of said collar;
and means for effecting orbital movement of said mandrel while rotating said mandrel.

24. A process for forming a length of moldable material that includes, providing a forming zone defined by a rigid closed surface, positioning said length adjacent said forming zone, introducing a rotating mandrel into said forming zone, and orbiting said rotating mandrel around said surface to compress the material displaced by said mandrel against said surface to thereby form said extension, the surface speed of rotation of said mandrel with respect to said material being at least equal to the surface speed of rotation that would take place if said mandrel were being rolled over said material during its orbital movement.

References Cited
UNITED STATES PATENTS

| | | | |
|---|---|---|---|
| 2,277,789 | 3/1942 | Sink | 25—35 |
| 2,892,218 | 6/1959 | McGhee et al. | 25—36 |
| 2,929,300 | 3/1960 | Zwick | 51—90 |
| 3,200,184 | 8/1965 | Schulze | 264—296 |

J. SPENCER OVERHOLSER, *Primary Examiner.*

R. D. BALDWIN, *Assistant Examiner.*